(12) United States Patent
Mueller

(10) Patent No.: US 10,192,446 B2
(45) Date of Patent: Jan. 29, 2019

(54) METHOD, SYSTEM, AND COMPUTER PROGRAM PRODUCT FOR DETECTING A POSSIBLE LANE CHANGE OF A FELLOW VEHICLE, ALSO A VEHICLE

(71) Applicant: HELLA GmbH & Co. KGaA, Lippstadt (DE)

(72) Inventor: Bernhard Mueller, Hamburg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/801,595

(22) Filed: Nov. 2, 2017

(65) Prior Publication Data

US 2018/0122244 A1 May 3, 2018

(30) Foreign Application Priority Data

Nov. 2, 2016 (DE) .................. 10 2016 120 876

(51) Int. Cl.
| | |
|---|---|
| *G05D 1/00* | (2006.01) |
| *G08G 1/16* | (2006.01) |
| *B60K 31/00* | (2006.01) |
| *B60W 30/12* | (2006.01) |
| *B60W 30/16* | (2012.01) |
| *G06K 9/00* | (2006.01) |

(52) U.S. Cl.
CPC ......... *G08G 1/167* (2013.01); *B60K 31/0008* (2013.01); *B60W 30/12* (2013.01); *B60W 30/16* (2013.01); *G06K 9/00805* (2013.01); *B60K 2031/0025* (2013.01); *B60T 2201/089* (2013.01); *B60W 2420/42* (2013.01); *B60W 2420/52* (2013.01); *B60W 2550/30* (2013.01)

(58) Field of Classification Search
None
See application file for complete search history.

(56) References Cited

U.S. PATENT DOCUMENTS

| | | | | |
|---|---|---|---|---|
| 2007/0142995 | A1* | 6/2007 | Wotlermann | ...... B60K 31/0008 701/96 |
| 2013/0085976 | A1* | 4/2013 | Bone | ............... B60W 30/18163 706/46 |
| 2013/0261872 | A1* | 10/2013 | Ferguson | ................. G05D 1/00 701/28 |
| 2017/0174261 | A1* | 6/2017 | Micks | ..................... B62D 6/00 |

FOREIGN PATENT DOCUMENTS

| | | |
|---|---|---|
| DE | 10 2009 007 885 A1 | 8/2010 |
| DE | 10 2014 213 259 A1 | 1/2016 |

* cited by examiner

*Primary Examiner* — Brent Swarthout
(74) *Attorney, Agent, or Firm* — Muncy, Geissler, Olds & Lowe, P.C.

(57) ABSTRACT

A method for detecting a possible lane change of a fellow vehicle in the environment of a vehicle, wherein the vehicle is located in a first lane, is provided. A system is also provided having a control unit and at least one sensor device for detecting a possible lane change of a fellow vehicle in the environment of a vehicle, wherein the vehicle is located in a first lane. Furthermore, a vehicle is provided having a system for detecting a possible lane change of a fellow vehicle in the environment of the vehicle, as well as a computer program product for detecting a possible lane change of a fellow vehicle in the environment of a vehicle.

14 Claims, 4 Drawing Sheets

METHOD, SYSTEM, AND COMPUTER PROGRAM PRODUCT FOR DETECTING A POSSIBLE LANE CHANGE OF A FELLOW VEHICLE, ALSO A VEHICLE

This nonprovisional application claims priority under 35 U.S.C. § 119(a) to German Patent Application No. 10 2016 120 876.0, which was filed in Germany on Nov. 2, 2016, and which is herein incorporated by reference.

BACKGROUND OF THE INVENTION

Field of the Invention

The invention relates to a method for detecting a possible lane change of a fellow vehicle in an environment of a vehicle, wherein the vehicle is located in a first lane. In addition, the invention relates to a system having a control unit and at least one sensor device, for detecting a possible lane change of a fellow vehicle in the environment of a vehicle, wherein the vehicle is located in a first lane. Furthermore, the invention relates to a vehicle having a system for detecting a possible lane change of a fellow vehicle in the environment of the vehicle as well as a computer program product for detecting a possible lane change of a fellow vehicle in the environment of a vehicle.

Description of the Background Art

Modern vehicles are usually equipped with a multitude of sensor devices in order to obtain environmental data on the vehicle's environment and thus be able to provide monitoring of the vehicle's environment. Safety devices, such as collision warning systems and the like, can analyze these environmental data and, for example, warn a vehicle user of possible hazards. In addition, systems that are designed to at least partially operate the vehicle, for example a brake assist system, a parking assist system, or adaptive cruise control, can be based on analysis of the environmental data or analysis of a monitoring of the environment.

Stationary objects, but especially also other vehicles (fellow vehicles) in the vehicle's environment can be detected and monitored as sources of a possible hazard. In the case of fellow vehicles, their motion, especially relative to the vehicle, is particularly relevant, for example a potential upcoming lane change by the fellow vehicle into a lane used by the vehicle. To detect a lane change of this nature, it is known, for example, to monitor a directional indicator, for example a turn signal, and/or a lateral velocity of the fellow vehicle. It has proven disadvantageous here that a lane change, for example, is often carried out without a directional indicator being used to indicate the execution of the change in direction. Moreover, misinterpretations in detection can occur here, for example in the case of oversize loads with yellow rotating warning lights in place. Monitoring of the lateral velocity, especially at high speeds, oftentimes permits detection of a lane change only shortly before the fellow vehicle is already located in the vehicle's lane. This can lead to critical situations.

SUMMARY OF THE INVENTION

It is therefore an object of the invention to at least partially overcome the above-described disadvantages in the conventional methods, systems, and computer program products for detecting a possible lane change of a fellow vehicle in the environment of a vehicle, and also in vehicles. In particular, it is an object of the invention to provide a method, a system, and a computer program product for detecting a possible lane change of a fellow vehicle in the environment of a vehicle, as well as a vehicle, that permit an especially early and reliable detection of a possible lane change of a fellow vehicle in the environment of a vehicle in a simple and economical manner.

The object is attained in, for example an exemplary embodiment, by a method for detecting a possible lane change of a fellow vehicle in the environment of a vehicle. In addition, the object is attained by a system for detecting a possible lane change of a fellow vehicle in the environment of a vehicle. Features described in connection with a method according to the invention also apply, of course, in connection with a system according to the invention, a vehicle according to the invention, and a computer program product according to the invention, and vice versa in each case, so that reciprocal reference is always made or can always be made with regard to the disclosure of the individual aspects of the invention.

According to an exemplary embodiment of the invention, the object is attained by a method for detecting a possible lane change of a fellow vehicle in the environment of a vehicle, wherein the vehicle is located in a first lane. A method according to the invention can have the following steps:

a) Sensing of environmental data of an environment of the vehicle by at least one sensor device,
b) Detecting a fellow vehicle in a second lane next to the first lane through analysis by a control unit of the environmental data determined in step a), wherein a speed and a distance of the fellow vehicle are sensed,
c) Repeated monitoring by the control unit of the speed of the fellow vehicle in order to detect an acceleration of the fellow vehicle,
d) Repeated monitoring by the control unit of the distance of the fellow vehicle in order to detect a change in the distance, and
e) Detection of the possible lane change through analysis by the control unit of the monitorings from steps c) and d) if an acceleration ascertained in step c) and a change in distance ascertained in step d) are present.

For the most part, when a vehicle is driving, in particular in road traffic, fellow vehicles are moving about in its environment. In other words, "fellow vehicles" in the meaning of the invention can be understood to be other vehicles that are likewise participating in road traffic. Especially on freeways, but also on large highways or, for example, on local roads, multiple lanes may be present for vehicles to use. On-ramps and/or acceleration lanes also represent separate lanes in the meaning of the invention. A change in the lane used by fellow vehicles can and will occur often, including, in particular, the case when the fellow vehicle is located in a lane next to the vehicle's lane and the lane change takes place to the lane used by the vehicle itself. Precisely this lane change can be detected early and reliably by means of a method according to the invention. Direct warning, for example visual and/or acoustic warning, of a user of the vehicle, or a provision of the information about a detected, upcoming lane change of a fellow vehicle to a system that is designed to at least partially operate the vehicle, for example a brake assist system, a parking assist system, or adaptive cruise control, can be provided. Taken as a whole, it is possible to increase safety when using a vehicle.

A method according to the invention is provided for execution in or by a vehicle. Also, a corresponding system that is designed for carrying out a method according to the invention can be present in such a vehicle. In addition, a computer program product can be configured such that it can be used in such a vehicle or such a system for carrying out a method according to the invention.

In a first step a), environmental data of the environment of the vehicle are determined. This determination is performed by at least one suitable sensor device of the system or of the vehicle that carries out the method according to the invention. Various sensor systems, for example radar, lidar, infrared, ultrasound, and/or imaging methods, can be used for determining environmental data. Based on these environmental data, a digital representation of at least parts of the vehicle's environment is thus available after performance of step a) of a method according to the invention.

In the next step b), these environmental data determined in step a) are then analyzed by a control unit. The control unit here can preferably likewise be part of the system or of the vehicle that carries out the method according to the invention. This analysis makes it possible to provide that a fellow vehicle is detected in the vehicle's environment. When a method according to the invention is carried out, the fellow vehicle is detected when, in particular, it is traveling in a second lane next to the first lane in which the vehicle is traveling in which the method according to the invention is carried out. In the case of a lane change, this fellow vehicle can change to the first lane and thus impede or even endanger travel of the vehicle. In addition to the mere presence of the vehicle, in step b) of a method according to the invention a speed and in a distance of the fellow vehicle are also sensed. An absolute speed, but also, e.g., a relative speed, in particular with respect to the vehicle, can be sensed as the speed here. In this context, the speed can be determined as a magnitude, but also as a directional quantity. Any distance of the fellow vehicle to another object, for example the vehicle itself, but also, e.g., to road boundaries such as guardrails or lane markings, that describes a position of the fellow vehicle within the second lane can be used as the distance in the meaning of the invention. On the whole, therefore, after step b) information is available about the position where the fellow vehicle is located within the second lane and the speed at which it is traveling.

In the subsequent two steps c) and d) of a method according to an exemplary embodiment of the invention, repeated monitoring is undertaken of the quantities of the fellow vehicle sensed in step b), which is to say the speed and the distance. Monitoring in the meaning of the invention comprises, in particular, multiple repetitions of measurement and acquisition of the quantity in question, for example at regular time intervals of a few tenths of a second. In this way, it is possible to detect a change in these quantities over time.

In step c), the speed of the fellow vehicle is monitored repeatedly. A change in the speed here can mean an acceleration of the fellow vehicle in each case. It is thus possible to reliably detect such an acceleration of the fellow vehicle through the repeated monitoring of the speed. In the meaning of the invention, acceleration is understood to mean essentially an increase in speed. In addition, a reduction in speed, and even a change in the direction of travel, can also represent an acceleration.

In step d), the distance of the fellow vehicle is monitored repeatedly. A change in the distance here can mean a change in the fellow vehicle's position within the second lane in each case. It is thus possible to reliably detect such a change in the fellow vehicle's position within the second lane through the repeated monitoring of the distance. In the meaning of the invention, a change in the distance is understood to mean essentially a change in the position of the fellow vehicle within the second lane, wherein the longitudinal motion of the fellow vehicle along the second lane is preferably disregarded. In particular, a change in the position of the fellow vehicle relative to the vehicle can be detected quickly and reliably in this way.

In the final step e) of a method according to the invention, the results of the steps c) and d) are analyzed by the control unit. When an acceleration of the fellow vehicle, which is to say preferably, in particular, an increase in the speed of the fellow vehicle, and a change in the distance of the fellow vehicle, which is to say preferably, in particular, a reduction in the relative distance of the fellow vehicle to the vehicle, are present at the same time, then a possible lane change is detected in this step e). When both quantities are present, which is to say acceleration and change in distance, there is a high probability that the fellow vehicle will actually undertake a lane change from the second lane into the first lane in the near future. The presence of only one of the two quantities, in contrast, does not yet allow a conclusion to be reliably drawn as to whether a lane change is imminent. All in all, an especially early and reliable detection of a possible lane change of a fellow vehicle in the environment of a vehicle can therefore be provided by a method according to the invention in a simple and economical manner.

Preferably, provision can be made in a method according to the invention that the steps c) and d) are performed simultaneously or at least substantially simultaneously. Through simultaneous or at least substantially simultaneous monitoring of the speed and the distance, it is possible to provide, in particular to provide especially reliably, that an acceleration and a change in the distance can be detected at any time and, in particular, promptly. "Simultaneously or at least substantially simultaneously" in the meaning of the invention here also includes, in particular, that data from the same sensor device are analyzed for a detection of the speed and of the distance. A simultaneous monitoring in the meaning of the invention is also present when the measurements of the speed and distance that are required for monitoring the applicable quantity are carried out in alternation. On the whole, a simultaneous or at least substantially simultaneous execution of the steps c) and d) therefore makes it possible to increase a reliability in detecting the possible lane change on the one hand, and to reduce a time requirement in performing a method according to the invention on the other hand.

Furthermore, a method according to the invention can be designed to the effect that in order to detect the possible lane change in step e), the acceleration is compared with an acceleration limit and/or the change in distance is compared with a distance limit. A comparison with limits is an especially effective option, easily implemented in the control unit electronics, for providing a basis for decisions, here a detection of a possible lane change. Thus it is possible to conclude in the case of, for example, an acceleration that exceeds an acceleration limit and/or in the case of a change in distance that exceeds a distance value, that the fellow vehicle will soon execute a lane change or has already begun to execute the lane change. In the case of a distance, which is determined, for example, as a relative distance of the fellow vehicle to the vehicle or to a lane marking between the first and second lanes, a change in the distance here corresponds in particular to a decrease in this distance, and hence to a movement of the fellow vehicle towards the first lane. By means of an especially preferred comparison of both quantities with an applicable limit, a method according to the invention can be further improved.

In an embodiment, a method according to the invention can be improved such that the acceleration limit and/or the distance limit are defined as a function of one of the following parameters: speed of the vehicle, speed of the fellow vehicle, environment of the vehicle, and/or driver profile. This list is not exhaustive, so that the acceleration limit and/or the distance limit can also be dependent on additional parameters if this is useful and possible. The speed limit and/or distance limit used in step e) can be defined as a function of at least one of the parameters, but, for example, as a function of several of the parameters. In this way, it is possible to provide detection of a possible lane change of the fellow vehicle that is adapted especially well to the situation. Thus, the speeds of both the vehicle and the fellow vehicle can influence, for example, the safe distances between the vehicles that should be maintained. This can be taken into account when defining the distance limit, for example. An environment of the vehicle in the meaning of the invention is understood to mean, in particular, whether the vehicle is located on a freeway, a highway, or in a built-up area, for example. Each of these environments has, for example, customary speeds at which vehicles travel in these environments. This, too, can be taken into account when defining the limits. Taking a driver profile into account makes it possible for the definition of the acceleration limit and/or distance limit to also reflect who is currently the driver of the vehicle, for example. Thus, for example, it may suffice to warn an experienced vehicle driver of a possible lane change later than an inexperienced student driver.

In addition, provision can be made in a method according to the invention that a monitoring time window is used in each case for the monitoring in steps c) and d), and that a possible lane change is detected in step e) if the acceleration exceeds the acceleration limit and the change in distance exceeds the distance limit within a monitoring window and at the end of this monitoring window. As already noted above, a possible lane change of a fellow vehicle can be detected reliably and early by a method according to the invention. However, it is important to avoid a situation in which an erroneous detection causes, for example, a driver of the vehicle to be unnecessarily warned of a lane change that then does not take place after all and/or in which an adaptive cruise control initiates braking without a lane change by the fellow vehicle then in fact taking place. In order to avoid this, the repeated monitorings in steps c) and d) are performed in monitoring time windows. In particular, multiple monitoring operations, for example measurements of the speed and/or distance, take place within the monitoring window. If it is determined during an analysis of one of the monitorings during a monitoring window that the acceleration exceeds the acceleration limit, which is to say, in particular, that the fellow vehicle is speeding up, and that the change in distance exceeds the distance limit, which is to say, in particular, that the fellow vehicle is moving towards the first lane, then this is registered by and in the control unit. In the event that these limits are still exceeded or are exceeded again at the end of the same monitoring window, this is evaluated as an indication that a possible lane change is imminent. If, however, at least one of these limits is no longer exceeded at the end of the same monitoring window, the measurement is discarded and no possible lane change is detected. Erroneous detections can be prevented, or at least significantly restricted, by this condition that the limits must be exceeded at least twice within one monitoring window for there to be a detection of a possible lane change.

Alternatively, provision can be made in an embodiment of a method according to the invention that a monitoring time window is started in step e) if the acceleration exceeds the acceleration limit and the distance falls below the distance limit, and that a possible lane change is detected in step e) if the acceleration exceeds the acceleration limit and the distance falls below the distance limit at the end of this monitoring window. An erroneous detection of a possible lane change can be prevented, or at least significantly restricted, by this embodiment of a method according to the invention, as well. In contrast to the embodiment described above, the repeated monitoring operations are performed continually and continuously, without dividing them into time windows from the very start. However, if the criteria for detecting a possible lane change are detected, namely the speed limit and the distance limit each being exceeded once, then a monitoring time window is started. In the event that these limits are still exceeded or are exceeded again at the end of the monitoring window that was started, then this is likewise evaluated in this embodiment as an indication that a possible lane change is imminent. If, however, at least one of these limits is no longer exceeded at this point in time, the measurement is discarded and no possible lane change is detected. Erroneous detections can likewise be prevented, or at least significantly restricted, by this condition that the limits must be exceeded again at the end of a monitoring window for there to be a detection of a possible lane change.

In an embodiment of a method according to the invention, provision can additionally be made that a time period of 200 ms to 1 s, preferably of 500 ms, is chosen as the monitoring time window, wherein in particular the time period is chosen as a function of a vehicle speed. By means of a monitoring time window of this nature it is possible to ensure that only a short time elapses between the individual monitoring operations in which a presence of the above-mentioned criteria for a detection of a possible lane change was determined. In particular, this time period can also be chosen as a function of a vehicle speed, wherein preferably the higher the vehicle speed, the shorter the time period that is chosen. In this way, a detection of a possible lane change can be made more sensitive at high speeds in particular, thereby improving the safety of a use of the vehicle.

Also, a method according to the invention can be designed to the effect that the repeated monitoring in step c) and/or the repeated monitoring in step d) is carried out with a clock timing of less than 250 ms, preferably 125 ms, especially preferably less than 100 ms. The clock timing specifies in particular how often and at what time intervals the measurements for the repeated monitoring operations are carried out. By means of a clock timing of 250 ms or preferably still shorter intervals, an at least substantially uninterrupted and continuous monitoring of the speed and of the distance can be provided. In particular, the clock timing can preferably be chosen such that it is considerably shorter, in particular, than a monitoring window used for the monitoring. An adaptation of the clock timing to the monitoring window is also possible, for example a monitoring window of 500 ms and a clock timing of 125 ms. In this way it is possible to ensure that four monitoring operations are performed in every monitoring window in this example. In this way, overlooking of a presence of the criteria for a detection of a possible lane change within a monitoring window can be avoided or at least made considerably more difficult.

Furthermore, provision can be made in a method according to the invention that in steps b) and d), a distance of the fellow vehicle from a lane marking and/or a distance of the fellow vehicle from the vehicle is determined or monitored.

In this case, the distance of the fellow vehicle from a lane marking, in particular the lane marking between the first lane and the second lane, and/or from the vehicle represents an especially meaningful distance by which a position of the fellow vehicle within the second lane can be described. A decrease in such a distance, or an increase in a corresponding change in the distance, automatically corresponds here to an approach of the fellow vehicle to the first lane and, especially together with a simultaneous acceleration of the fellow vehicle, represents an unambiguous indication of a possible imminent lane change.

In addition, a method according to the invention can be designed to the effect that a state of a directional signal of the fellow vehicle is additionally monitored and analyzed by the at least one sensor device and the control unit, wherein the analyzed state of the directional signal is taken into account in detection of the possible lane change in step e) by the control unit. An active directional signal, for example a turn signal, represents a possible indication that a lane change of the fellow vehicle could be imminent. This can be used to improve a method according to the invention. Thus, for example, when an active directional indicator is present a monitoring window as described above can be started, at the end of which an analysis of the speed and of the distance takes place for reliable detection of the possible lane change. Alternatively or in addition, a narrowing of the monitoring window and/or of the clock timing can also be carried out, for example, to refine the detection of a possible lane change. Thus, a detection of a possible lane change achieved by a method according to the invention can be further improved as a whole by additionally taking into account a state of such a directional signal.

Furthermore, provision can be made in a method according to the invention that for a vehicle designed as a left-hand-drive vehicle a lane to the right of the vehicle is used as the second lane, and/or that for a vehicle designed as a right-hand-drive vehicle a lane to the left of the vehicle is used as the second lane. Possible lane changes of a fellow vehicle can be detected by a method according to the invention. Such lane changes can represent a hazard for the vehicle, in particular when they are carried out by a fellow vehicle that is traveling more slowly than the vehicle. This is the case in the great majority of lane changes when the fellow vehicle is located in a second lane to the right of the vehicle before the lane change if the vehicle is a left-hand drive vehicle, or when the fellow vehicle is located in a second lane to the left of the vehicle before the lane change if the vehicle is a right-hand drive vehicle. Consequently, to improve safety in the use of a vehicle it may suffice to only monitor vehicles in this one relevant adjacent lane with regard to a possible lane change. A method according to the invention can be simplified overall through monitoring of only one adjacent lane, the adjacent lane on the right for left-hand drive vehicles or the adjacent lane on the left for right-hand drive vehicles. The corresponding requirements for the control unit and the sensor devices used can also be reduced thereby, as a result of which a cost saving can be achieved overall.

According to an embodiment of the invention, the object is attained by a system, having a control unit and at least one sensor device, for detecting a possible lane change of a fellow vehicle in the environment of a vehicle, wherein the vehicle is located in a first lane. A system according to the invention is characterized in that the control unit and the at least one sensor device are designed to carry out a method according to the first aspect of the invention. A system according to the invention is thus designed as a whole to carry out a method according to the first aspect of the invention. In this way, all the advantages that have already been described in detail with respect to an inventive method according to the first aspect of the invention, can also be provided by an inventive system according to the second aspect of the invention.

In addition, provision can be made in a system according to the invention that the at least one sensor device has at least one of the following sensors: camera sensor, long-range radar sensor, short-range radar sensor, lidar sensor, ultrasonic sensor, and/or infrared sensor. This list likewise is not exhaustive, so that the at least one sensor device can also have additional sensors if this is useful and possible. Multiple sensors, even structurally separate sensors, can also be combined in the sensor device. An optical image of the environment can be recorded by a camera sensor. Such a camera sensor can be used in particular for detection of, e.g., lane markings. Furthermore, a determination of a spatial arrangement of the fellow vehicle in the environment of the vehicle can be made by a camera sensor, equally well as by the other sensors named in the list, thereby providing data for a determination of a distance and/or a speed of the fellow vehicle. Overall, the use of one such sensor, especially preferably multiple such sensors, can provide a complete picture of the environment to the control unit through the data obtained.

According to an embodiment of the invention, the object is attained by a vehicle having a system for detecting a possible lane change of a fellow vehicle in the environment of the vehicle. A vehicle according to the invention is characterized in that the system is designed according to the second aspect of the invention. An inventive system according to the second aspect of the invention is designed to carry out a method according to the first aspect of the invention. A vehicle according to the invention is thus likewise designed as a whole to carry out an inventive method according to the first aspect of the invention. In this way, all the advantages that have already been described in detail with respect to an inventive method according to the first aspect of the invention and with respect to an inventive system according to the second aspect of the invention, can also be provided by a vehicle according to the third aspect of the invention.

Further, provision can be made in a vehicle according to the invention that the vehicle has an adaptive cruise control, wherein the adaptive cruise control is designed to use information from the system about a possible lane change of the fellow vehicle in the environment of the vehicle. An adaptive cruise control is a system that provides speed regulation in a vehicle, wherein in particular a distance or a separation from a preceding vehicle is incorporated into this regulation. It is also possible to take into account detected traffic signs, in particular speed limits. Through the use of information from a system according to the invention, possible imminent lane changes of fellow vehicles in adjacent lanes can also be taken into account in regulating speed even before the fellow vehicle is located in the vehicle's lane. Because these possible lane changes can be detected especially reliably, and in particular at an especially early point in time, by a system according to the invention, an adaptive cruise control that uses this information to regulate the speed of the vehicle can also take suitable measures especially early, for example a reduction in propulsion or active braking to reduce speed. Sudden and abrupt braking such as occurs in the case of late detection of a lane change in which the fellow vehicle oftentimes is already at least partially in the vehicle's lane, can be avoided in this way. A perceived sense of comfort of a vehicle user when using the adaptive cruise control can be enhanced in this way.

Moreover, according to an exemplary embodiment of the invention, a computer program product for detecting a possible lane change of a fellow vehicle in the environment of a vehicle is made available within the scope of the present invention, wherein the computer program product is designed for use in a system as described above according to the second aspect of the invention and/or in a vehicle as described above according to the third aspect of the invention and is configured to carry out the method described in detail above according to the first aspect of the invention. Thus, the computer program product according to the invention also yields the same advantages as have been described in detail above. As presented above, detection of a possible lane change of a fellow vehicle in the environment of the vehicle can be made available by the computer program product according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
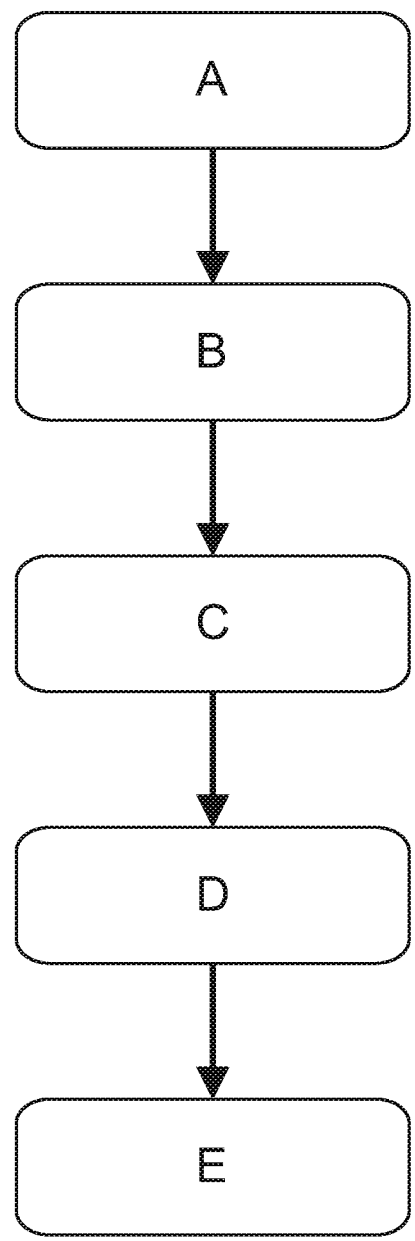
FIG. 1 illustrates a flowchart for a method according to the invention.
Figure 2:
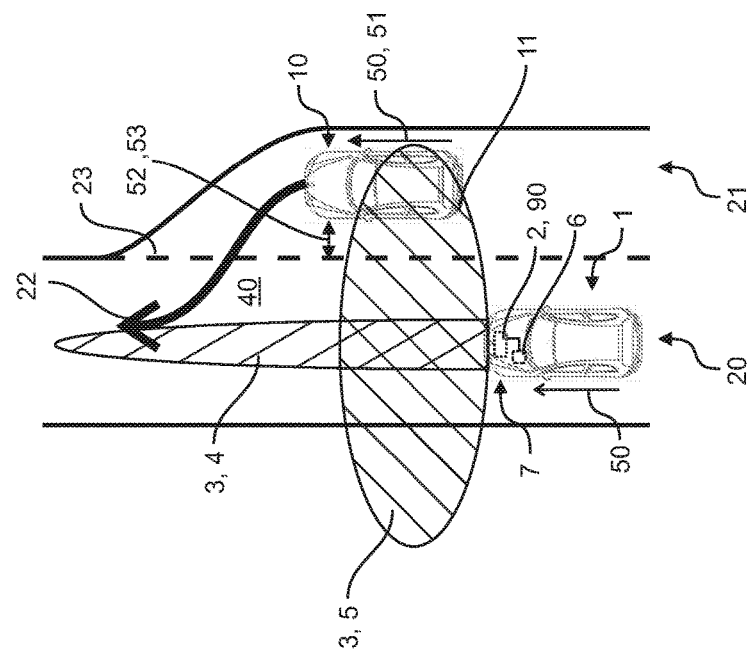
FIG. 2 illustrates two possible driving situations with lane changes of fellow vehicles.
Figure 2:
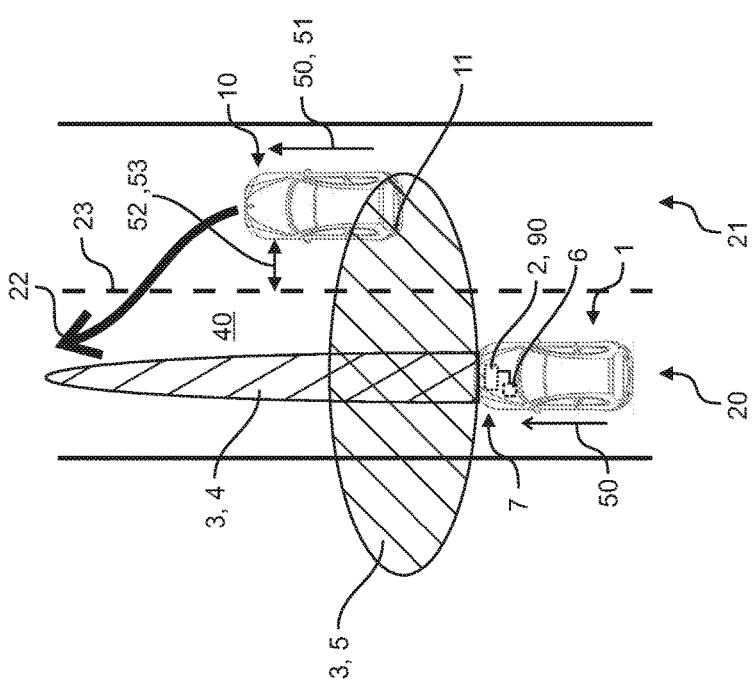

Shown in FIG. 1 is a method according to the invention such as can be performed by, e.g., a vehicle 1 according to the invention or a system 7 according to the invention such as are shown in FIG. 2, and/or is provided by a computer program product 90 according to the invention. Consequently, FIGS. 1 and 2 are both described together below.

Shown in FIG. 2 are two possible driving situations for a vehicle 1 in which a lane change 22 of a fellow vehicle 10 is imminent. In each case, the vehicle 1 is located in a first lane 20 and the fellow vehicle 10 is located in a second lane 21 to the right of and next to the first lane 20. In the left-hand illustration, the second lane 21 is a lane of a multilane road and the right lane is an acceleration lane, for example a highway on-ramp. The two illustrations do not differ except for the different design of the second lane 21, so the two figures are described together below. Shown in each case is a vehicle 1 according to the invention that is equipped with a system 7 according to the invention. Here, the system 7 according to the invention has in particular a control unit 2. This control unit 2 is coupled to sensor devices 3, which are implemented as a long-range radar sensor 4 and a short-range radar sensor 5 in the embodiment shown of a system 7 according to the invention. For the purposes of illustration, the detection regions of each of the sensor devices 3 are shown. A sensor device 3 of a system 7 according to the invention can also have other alternative or additional sensors, for example a camera sensor or a lidar sensor. Moreover, a computer program product 90 according to the invention that is configured to perform a method according to the invention is stored in the control unit 2 of the system 7. In addition, the vehicle 1 can, as shown, be implemented as a left-hand drive vehicle, wherein preferably only second lanes 21 to the right of the vehicle 1 are considered by the system 7 according to the invention or by the method. According to a first step a) of a method according to the invention, labeled A in FIG. 1, environmental data of the environment 40 are sensed by the sensor device 3. Based on these environmental data, a fellow vehicle 10 in the environment 40 of the vehicle 1, in particular in the second lane 21, is detected by the control unit 2 in the subsequent step b), labeled B in FIG. 1, wherein in particular a speed 50 and a distance 52 of the fellow vehicle 10 are sensed. In the embodiments shown, a distance of the fellow vehicle 10 from a lane marking 23 located between the first lane 20 and the second lane 21 is sensed as the distance 52 in each case. Alternatively or in addition, a distance between the vehicle 1 and the fellow vehicle 10 can also be used as the distance 52. In the next two steps c) and d) of a method according to the invention, labeled C and D in FIG. 1, which can be carried out sequentially or preferably also simultaneously (not shown), both the speed 50 and the distance 52 of the fellow vehicle 10 are monitored repeatedly. In this context, repeated monitoring in the meaning of the invention includes, in particular, repeated measurement of these quantities, in particular with a clock timing 71 of preferably less than 250 ms. The repeated monitoring is performed by the control unit 2 with the goal of detecting changes in the speed 50 and the distance 52 as early as possible. Such changes are, in particular, in the case of the speed 50 an acceleration 51, in the case of the distance 52 a change 53 thereof. In the last step e) of a method according to the invention, labeled E in FIG. 1, these monitorings are analyzed by the control unit 2 in order to detect an imminent possible lane change 22 of the fellow vehicle 10. As early as during this analysis, a presence of an acceleration 51 and a change 53 in the distance 52 can be interpreted to mean that a possible lane change 22 is imminent. Preferably, the acceleration 51 is compared with an acceleration limit 60 and the change 53 in the distance 52 is also compared with a change limit in order to be able to provide a still better, and in particular unambiguous, detection of a possible lane change 22. The acceleration limit 60 and/or the change limit can be defined as a function of parameters, for example a speed 50 of the vehicle 1 and/or of the fellow vehicle 10 or an environment 40 of the vehicle 1, for example in order to take into account a driving situation of the vehicle 1. An additional monitoring and analysis of a directional signal 11 of the fellow vehicle 10 can also be taken into account in the detection of the possible lane change 22 in step e), for example by adapting the acceleration limit 60 and/or the distance limit 61. If it is now determined in the analysis in step e) that not only does the acceleration 51 exceed the acceleration limit 60, but the change 53 in the distance 52 also exceeds the change limit, which in this embodiment is synonymous with a reduction of the distance 52 of the fellow vehicle 10 from the lane marking 23, then an imminent possible lane change 22 of the fellow vehicle 10 from the second lane 21 to the first lane 20 is detected. This information can then be output to the driver of the vehicle 1, for example as a visual, acoustic, and/or haptic warning signal. The illustrated vehicle 1 further has an adaptive cruise control 6 that is designed to regulate the speed 50 of the vehicle 1, and to which this information can likewise be made available. Thus the adaptive cruise control 6 can also undertake suitable actions at an early point in time, for example reducing a propulsion of the vehicle 1 and/or active braking to reduce the speed 50 of the vehicle 1. A perceived sense of comfort of a user of the vehicle 1 can be enhanced in this way. Taken as a whole, therefore, safety in the use of a vehicle 1 in road traffic can be improved through the reliable and early detection of a lane change 22 of a fellow vehicle 10.

Figure 3:
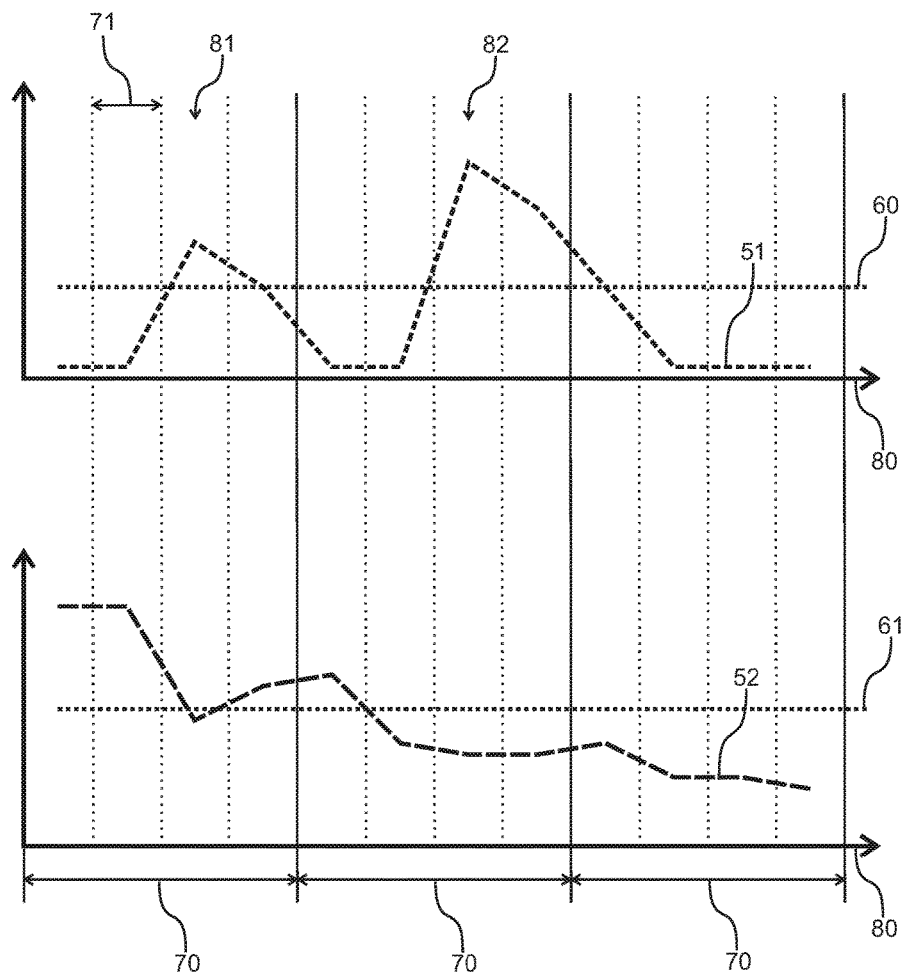
FIG. 3 illustrates an embodiment of steps c) to e) of a method according to the invention.

Shown in FIG. 3 is a first embodiment of steps c) to e) of a method according to the invention. Shown over time 80 are the monitored speed 50 in the top illustration, and the monitored distance 52 in the bottom illustration. The individual measurements of the speed 50 and of the distance 52 take place with a clock timing 71 that is likewise shown. The clock timing 71 here is chosen to be less than 250 ms, preferably less than 125 ms. An at least substantially continuous monitoring can be provided in this way. In this embodiment of a method according to the invention, the monitoring is divided in time into monitoring windows 70, wherein the monitoring window 70 covers multiple clock timings 71. The monitoring window 70 can have a duration of 200 ms to 1 s, preferably 500 ms. Adapting the definition of the duration of the monitoring window 70 to parameters, for example a speed 50 of the vehicle 1 and/or of the fellow vehicle 10, is also possible. In each clock timing 71, the speed 50 is compared with a speed limit and the distance 52 or the change 53 in the distance 52 (not shown) is compared with a distance limit 61 during the monitoring. If it is now determined, as here at the first time 81 and at the second time 82, that both the acceleration limit 60 and the distance limit 61 are violated, this represents an initial indication that a possible lane change 22 (not shown) could be imminent. To avoid erroneous detections, at the end of the associated monitoring window 70 another check is made as to whether the violations of the acceleration limit 60 and of the distance limit 61 are still present or are present again. For the monitoring window 70 that contains the first time 81, this is not the case. A detection of a possible lane change 22 is thus discarded in this case. The situation is different at the end of the monitoring window 70 that contains the second time 82. There, both the acceleration limit 60 and the distance limit 61 are still violated by the monitored speed 50 and the monitored distance 52, respectively, of the fellow vehicle 10 (not shown). A possible lane change 22 of the fellow vehicle 10 is detected in this case by the control unit 2 (not shown). Erroneous detections can be prevented, or at least significantly restricted, by this condition that the limits 60, 61 must be exceeded at least twice within one monitoring window 70 for there to be a detection of a possible lane change 22.

Figure 4:
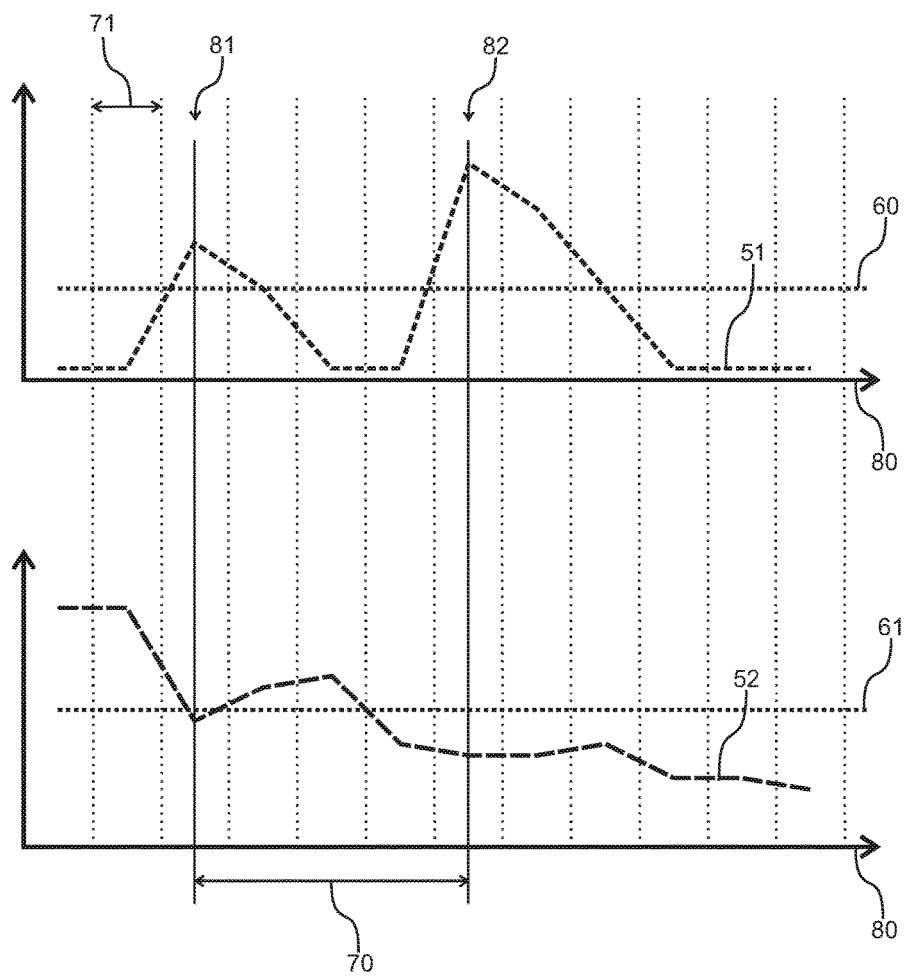
FIG. 4 illustrates an embodiment of steps c) to e) of a method according to the invention.

In FIG. 4, an alternative embodiment of steps c) to e) of a method according to the invention is shown. As in FIG. 3, the monitored quantities of the fellow vehicle 10, namely the speed 50 and the distance 52, are plotted over time 80. Reference is therefore made to FIG. 3 for a description of these illustrations. In contrast to the embodiment shown in FIG. 3, in this option of a method according to the invention a monitoring window 70 is started when a violation of both the acceleration limit 60 and the distance limit 61 is present, as is the case here at the first time 81. Once again, the monitoring window 70 can have a duration of 200 ms to 1 s, preferably 500 ms. Adapting the definition of the duration of the monitoring window 70 to parameters, for example a speed 50 of the vehicle 1 and/or of the fellow vehicle 10, is again possible as well. For reliable and unambiguous detection of a lane change 22 of a fellow vehicle 10 (not shown), in this embodiment a check is now made as to whether the violations of the acceleration limit 60 and of the distance limit 61 are still present or are present again at the end of the monitoring window 70, here at the second time 82. Only in this case is a possible lane change 22 detected in step e) of a method according to the invention. In this alternative embodiment as well, erroneous detections can thus be prevented, or at least significantly restricted, by the condition that the limits 60, 61 must be exceeded at least twice, at the beginning and end of a monitoring window 70, for there to be a detection of a possible lane change 22.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting a possible lane change of a fellow vehicle in an environment of a vehicle, the vehicle being located in a first lane, the method comprising:
    sensing environmental data of an environment of the vehicle by at least one sensor device;
    detecting a fellow vehicle in a second lane next to the first lane through analysis by a control unit of the environmental data sensed, wherein a speed and a distance of the fellow vehicle are sensed;
    repeated monitoring by the control unit of the speed of the fellow vehicle to detect an acceleration of the fellow vehicle;
    repeated monitoring by the control unit of the distance of the fellow vehicle in order to detect a change in the distance; and
    detecting the possible lane change through analysis by the control unit of the monitoring by the control unit of the speed and the distance if an acceleration is ascertained and a change in distance is ascertained,
    wherein, in order to detect the possible lane change, the acceleration is compared with an acceleration limit and/or the change in distance is compared with a distance limit, and
    wherein a monitoring time window is used for the monitoring of the speed and distance, and wherein a possible lane change is detected if the acceleration exceeds the acceleration limit and the change in distance exceeds the distance limit within the monitoring time window and at the end of the monitoring time window.

2. The method according to claim 1, wherein the monitoring of the speed and distance are performed simultaneously or at least substantially simultaneously.

3. The method according to claim 1, wherein the acceleration limit and/or the distance limit are defined as a function of at least one of the following parameters: speed of the vehicle, speed of the fellow vehicle, environment of the vehicle, and/or driver profile.

4. A method for detecting a possible lane change of a fellow vehicle in an environment of a vehicle, the vehicle being located in a first lane, the method comprising:
    sensing environmental data of an environment of the vehicle by at least one sensor device;
    detecting a fellow vehicle in a second lane next to the first lane through analysis by a control unit of the environmental data sensed, wherein a speed and a distance of the fellow vehicle are sensed;

repeated monitoring by the control unit of the speed of the fellow vehicle to detect an acceleration of the fellow vehicle;

repeated monitoring by the control unit of the distance of the fellow vehicle in order to detect a change in the distance; and detecting the possible lane change through analysis by the control unit of the monitoring by the control unit of the speed and the distance if an acceleration is ascertained and a change in distance is ascertained, wherein, in order to detect the possible lane change, the acceleration is compared with an acceleration limit and/or the change in distance is compared with a distance limit, and wherein a monitoring time window is started if the acceleration exceeds the acceleration limit and the change in distance exceeds the distance limit, and wherein a possible lane change is detected if the acceleration exceeds the acceleration limit and the change in distance exceeds the distance limit at an end of the monitoring time window.

5. The method according to claim 1, wherein a time period of 200 ms to 1 s, or 500 ms is chosen as the monitoring time window, wherein the time period is chosen as a function of a vehicle speed.

6. The method according to claim 1, wherein the repeated monitoring of the speed and/or distance is carried out with a clock timing of less than 250 ms, 125 ms, or 100 ms.

7. The method according to claim 1, wherein a distance of the fellow vehicle from a lane marking and/or a distance of the fellow vehicle from the vehicle is determined or monitored.

8. The method according to claim 1, wherein a state of a directional signal of the fellow vehicle is additionally monitored and analyzed by the at least one sensor device and the control unit, wherein the analyzed state of the directional signal is taken into account in detection of the possible lane change by the control unit.

9. The method according to claim 1, wherein for a vehicle designed as a left-hand-drive vehicle, a lane to the right of the vehicle is used as the second lane and/or wherein for a vehicle designed as a right-hand-drive vehicle, a lane to the left of the vehicle is used as the second lane.

10. A system comprising:
a control unit; and
at least one sensor device for detecting a possible lane change of a fellow vehicle in an environment of a vehicle,
wherein the vehicle is located in a first lane, and
wherein the control unit and the at least one sensor device are configured to perform the method according to claim 1.

11. The system according to claim 10, wherein the at least one sensor device has at least one of the following sensors:
camera sensor,
long-range radar sensor,
short-range radar sensor,
lidar sensor,
ultrasonic sensor, and/or
infrared sensor.

12. A vehicle having a system according to claim 10 for detecting a possible lane change of a fellow vehicle in the environment of the vehicle.

13. The vehicle according to claim 12, wherein the vehicle has an adaptive cruise control, wherein the adaptive cruise control is designed to use information from the system about a possible lane change of the fellow vehicle in the environment of the vehicle.

14. A computer program product for detecting a possible lane change of a fellow vehicle in an environment of a vehicle that is designed for use in a system according to claim 10.

* * * * *